United States Patent [19]

Shum

[11] 4,392,776
[45] Jul. 12, 1983

[54] ROBOTIC MANIPULATOR STRUCTURE

[75] Inventor: Lanson Y. Shum, Salem Township, Westmoreland County, Pa.

[73] Assignee: Westinghouse Electric Corp., Pittsburgh, Pa.

[21] Appl. No.: 264,153

[22] Filed: May 15, 1981

[51] Int. Cl.³ .............................................. B25J 3/00
[52] U.S. Cl. .................................... 414/744 R; 414/4
[58] Field of Search ................. 414/4, 744 R, 744 A, 414/744 B, 744 C, 733, 737

[56] References Cited

U.S. PATENT DOCUMENTS 3,817,403  6/1974  Glachet et al. .......................... 414/4
3,985,238  10/1976 Nakura et al. ....................... 414/4 X

FOREIGN PATENT DOCUMENTS 881929   9/1971  Canada ............................... 414/737
738760   6/1943  Fed. Rep. of Germany ... 414/744 A
126276   5/1959  U.S.S.R. ......................... 414/744 B
503709   3/1976  U.S.S.R. ................................. 414/4
770780   10/1980 U.S.S.R. ......................... 414/744 R Primary Examiner—Robert J. Spar
Assistant Examiner—Terrance L. Siemens
Attorney, Agent, or Firm—E. C. Arenz

[57] ABSTRACT

A robotic manipulator structure including a base supporting first and second independently operable drive motors 16 and 18, a first swinging arm rotatably supported by the base and driven from the first drive, a second swinging arm 42 supported for rotation at the end of the first arm for rotation through a plane translationally displaced from the plane through which the first arm rotates, and a mechanism for coupling the rotation of the second drive motor 18 through the hollow shaft 50 concentrically located and rotatable within the hollow shaft 38, and through a sprocket and chain arrangement in the hollow 58 of the first arm to independently effect the rotation of the second arm 42.

7 Claims, 6 Drawing Figures

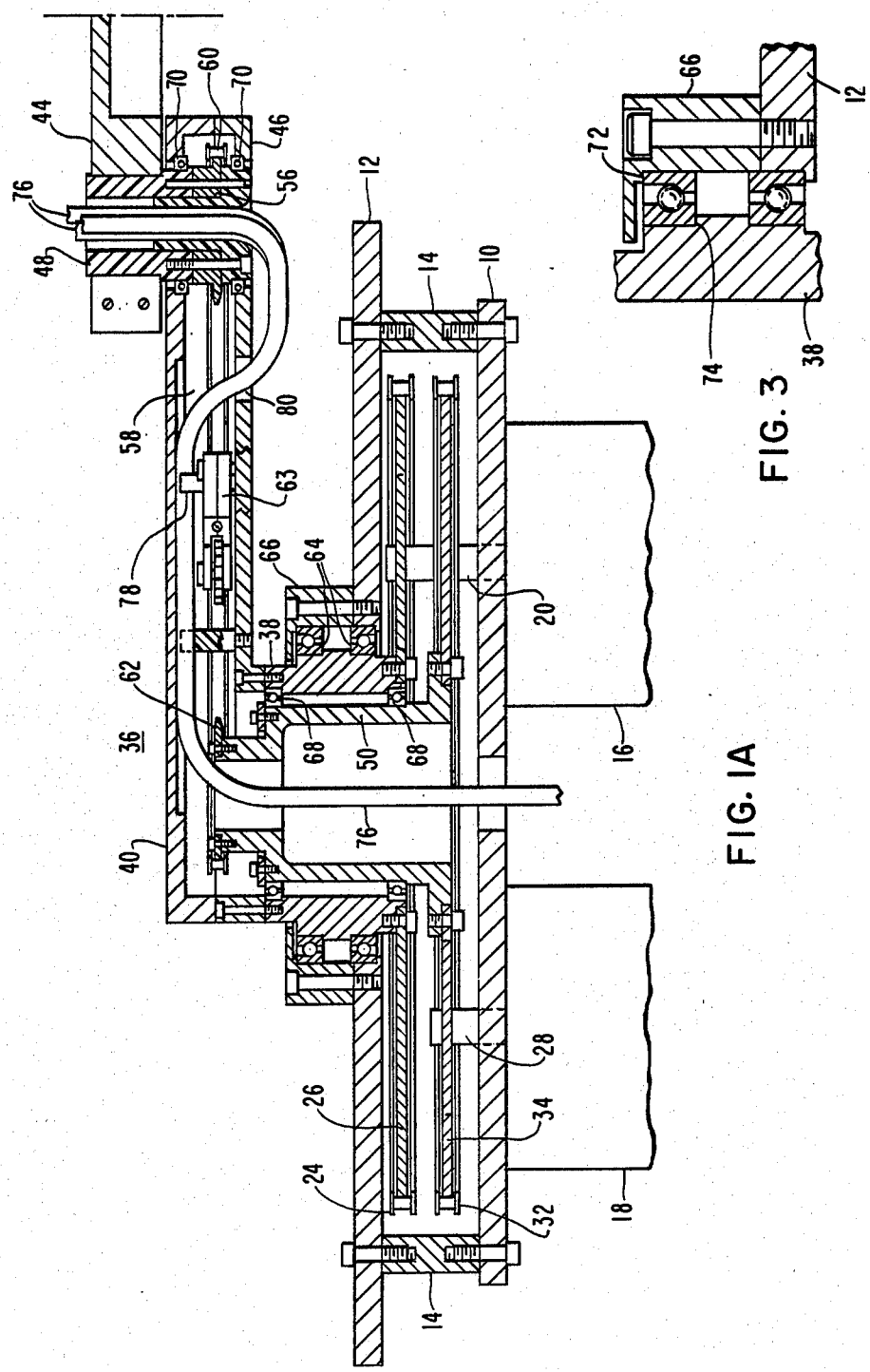

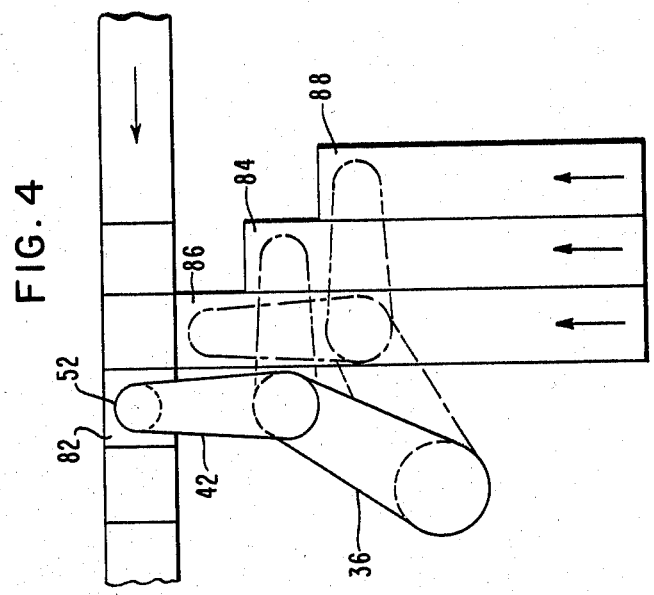
FIG. 4
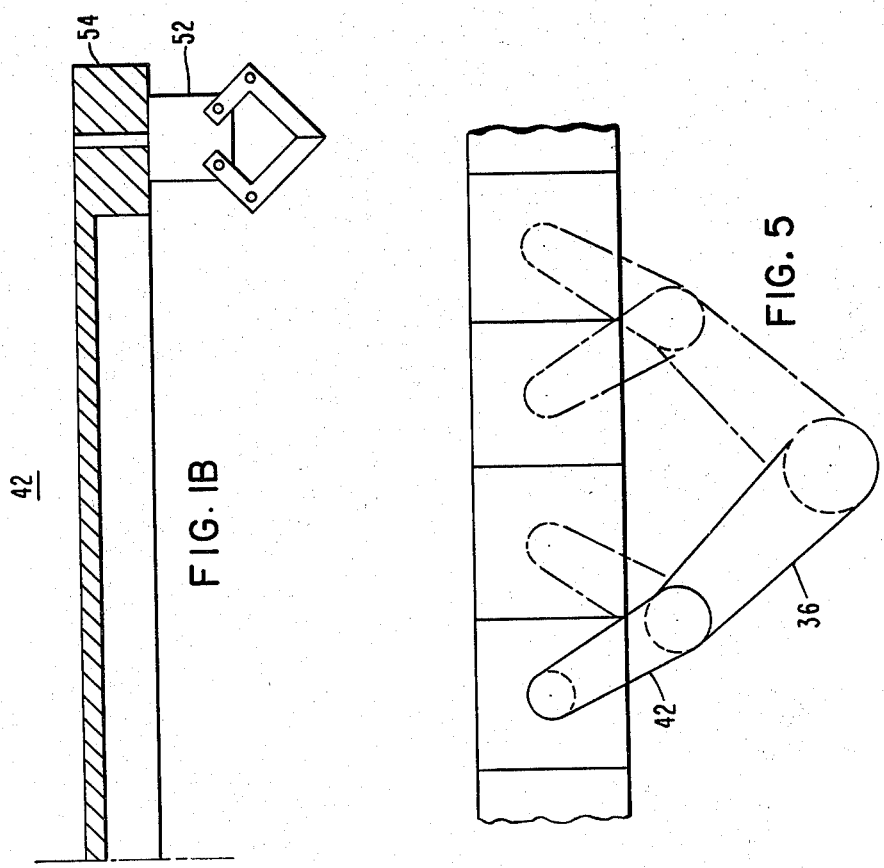
FIG. 1B
FIG. 5

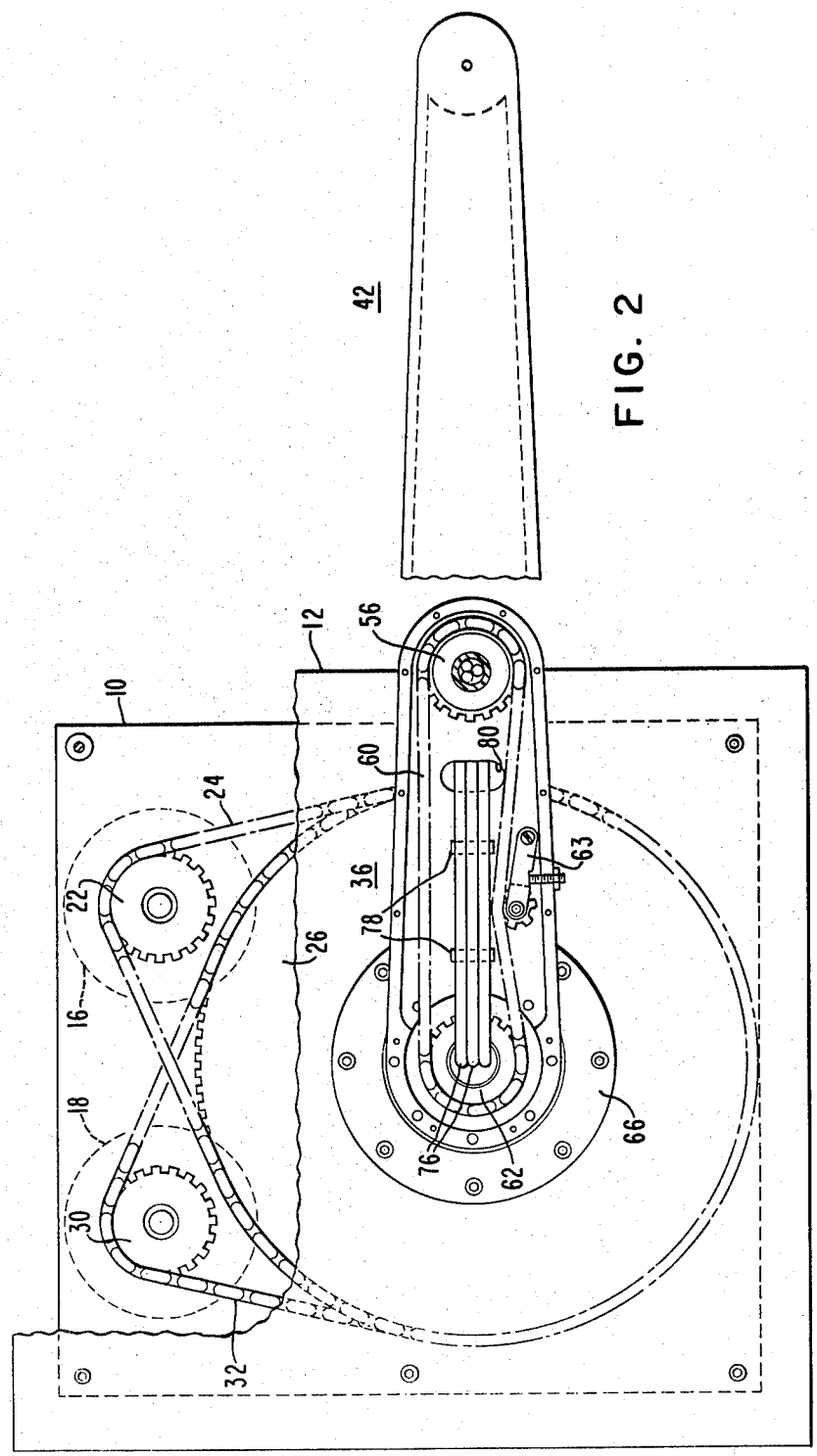

ROBOTIC MANIPULATOR STRUCTURE

BACKGROUND OF THE INVENTION

This invention pertains to the art of structures for robotic manipulators.

In certain manipulator operations, such as the assembly of small, lightweight components as electronic assemblies and printed circuit board testing, it is considered important that the manipulator have the ability to move quickly. At the same time, it is also considered important that accuracy and precision be maintained. It is my belief that a manipulator provided with rotary joints will provide for the desirable characteristics in a better way than with a joint using a linear motion mechanism. Also the structure should be such that backlash in the driving mechanisms is minimized to permit the precision operation.

Accordingly, the aim of my invention is to provide a structural arrangement for a manipulator which can be relatively lightweight to enhance its speed of operation (through the reduction of inertia of moving parts), which is provided with rotary joints, and is of a character to facilitate elimination of backlash in the drives.

SUMMARY OF THE INVENTION

In accordance with the invention there is provided a robotic manipulator structure which includes a base which supports first and second independently operable drive means, arm structure including first and second swinging arms, the first arm being rotatably supported by the base and means for driving the first arm from the first drive means for rotation through one planar space, the second arm having its one end rotatably carried, by the end of the first arm opposite the base, for rotation through another planar space which is translationally displaced from the first planar space, and means coupling the second drive means to drive the second arm independently of the first arm, the coupling means extending from the base through the first arm to said one end of said second arm.

DRAWING DESCRIPTION

FIGS. 1A and 1B are vertical cross sections through one embodiment of the structure according to the invention;

FIG. 2 is a partly broken top view of the structure with the top cover plate of the first arm removed;

FIG. 3 is a fragmentary sectional view, enlarged relative to FIG. 1, showing some detail of an angular contact bearing arrangement; and FIGS. 4 and 5 are primarily diagrammatic views of a manipulator arranged to operate through two different four station setups.

DETAILED DESCRIPTION OF ONE PREFERRED EMBODIMENT

Referring to FIG. 1, the base of the manipulator includes a pair of plates 10 and 12 spaced apart horizontally by a series of spacers 14 (only one shown) strategically located in spaced apart locations near the outer margin of the base. While the description will proceed with the manipulator disposed in the horizontal disposition, it will be understood that it may be oriented to function in other dispositions.

A first drive motor 16 and a second independently operable drive motor 18 are affixed to the lower plate 10 through means not shown. The drive shaft 20 for the first motor 16 projects up through the plate 10 and is provided with a sprocket 22 (FIG. 2) which is adapted through chain 24 to drive large gear sprocket 26. In a similar arrangement for the second motor 18, shaft 28 carries sprocket 30 to drive chain 32 and thus the other large sprocket 34.

A first swinging arm generally designated 36 is rotatably supported by the base for horizontal swinging movement through a first horiziontal planar space. The arm is generally hollow and is carried at its proximate end by the hollow shaft 38 which extends at a right angle relative to the length of the first arm and is supported from the base. The upper end of the shaft 38 is fixed to the proximate end 40 of the arm while the lower end of shaft 38 has the large sprocket 26 fixed thereto.

A second swinging arm generally designated 42 has its proximate end 44 rotatably supported at the distal end portion 46 of the first arm 36 through a hollow shaft 48. For clarity in the following description, this hollow shaft 48 is termed the third shaft since it is driven through means to be later described and which includes the larger hollow shaft 50 termed herein the second shaft.

The second arm 42 carries a work head 52 at its distal end 54. The work head is schematically illustrated since its form and function will be determined by the nature of the operation it is to perform, and the form of the work head as such is no part of this invention.

The second arm 42 has its proximate end 44 fixed to the upper end of the third shaft 48 for rotation therewith through a clamping attachment. The lower end of shaft 48 has driven means fixed thereto in the form of a sprocket 56 which is in alignment with the hollow interior portion 58 of the first arm 36. The third shaft 48, and accordingly the second arm 42, are rotatable through a horizontal plane by rotation of sprocket 56 linked through chain 60 to sprocket 62 fixed to the upper end of second shaft 50. The lower end of the second shaft has the large sprocket 34, driven from the second motor 18, fixed thereto. A chain tensioner 63 is provided in the first arm.

In the currently preferred embodiment, particularly for high accuracy operations, each of the three hollow shafts are rotatably supported from their respective supporting structures by angular contact bearings. The first set of bearings designated 64 function to rotatably support the first shaft 38 from the base, and are held between that first shaft and the outer bearing shell 66. The second set of bearings generally designated 68 are held between the first hollow shaft 38 and the second hollow shaft 50 concentrically disposed within the first shaft. The third set of bearings 70 are located at the distal end portion of the first arm and rotatably support the third shaft 48.

In FIG. 3 the enlarged view of part of the angular contact bearings 64 for supporting the first hollow shaft 38 is intended to illustrate how, through the diagonal clamping action, the bearing races are tightened upon the balls to reduce any looseness in the bearings to the end of eliminating backlash arising from bearings. As may be seen in this Figure, a shoulder 72 on the bearing shell 66 cooperates with a shoulder 74 on the first hollow shaft 38 to exert a diagonal clamping action on the inner and outer races of the bearing. With respect to each of the other set of bearings 68 and 70, similar structural shoulders at diagonals from each other are provided for the same purpose.

While the angular contact bearings are the preferred arrangement, particularly where a high degree of precision accuracy in the manipulator is desired, there will be other instances where the accuracy requirements may be considerably less. In such cases it may be desirable from a cost standpoint to use bushings or the like in place of the more expensive angular contact bearing arrangement.

Power for the operation of the work head may be either electric or pneumatic, depending upon the duty of the work head and the power sources conveniently available. To the end of supplying this power, flexible power supply conduit means 76 (FIG. 1) is preferably routed up through the second hollow shaft 50, then through the hollow first arm 36, with conduit supports 78 holding a length of the conduit in the proper location in the arm. The conduit extends for most of the length of the hollow arm and exits therefrom through a bottom opening 80 from whence it then is passed upwardly through the third hollow shaft 48. From there is can pass to the work head 52 along the top of the second arm 42, or if it is desirable that the conduit be exposed to the environment near the work head to a minimum degree, the second arm may be made with a hollow therein and the conduit passed therethrough. The conduit means must twist in their lengths which pass through the hollow shafts. Therefore the conduit means is selected with sufficient flexibility for the intended maximum angular rotation of the arms to accommodate the twisting without injury to the conduit. Since that part of the conduit 76 which passes to the supply has a relatively long length, the twisting is relatively small perunit length as compared to the twisting of the length which passes up through the third shaft 48. Since the maximum rotation contemplated for each arm is not greater than a full circle, conduit materials are ready available to accommodate the degree of twist.

The relationship of the rotation of the arms when either one or the other drive means is energized is perhaps best understood in connection with FIG. 2. When the outer hollow shaft 38, which rotates the first arm 36, is energized alone, the first arm will rotate while the second arm will continue to point in the same direction that it had pointed before the first arm rotation began. In other words, as the first arm 36 turns, the chain 60 will walk around the sprocket 62 and this will result in the sprocket 56 rotating to maintain the second arm pointed in the same direction as previously. This occurs because both the sprockets 56 and 62 have the same diameter and number of teeth. It is of course within the contemplation of the invention that it may be desirable that the pointing of the second arm changes its direction as the first arm rotates and this of course can be accomplished by utilizing sprockets of different diameter. It will of course be readily appreciated that if the first arm is maintained stationary and the second arm is driven through the rotation of the second shaft 50 and the coupled rotational mechanism, the second arm will simply rotate independently on the first arm.

The first and second driving means 16 and 18, respectively, may take any of various forms. For operations in which the work head is to be to a large number of different positions, electric servomotors with selfcontained tachometers and encoders may be desirable. An alternative embodiment of the drive means can be high performance stepping motors with a large number of fine steps, such as 25,000 steps, per revolution. However, in many instances in which pick and place operations are to be performed with a limited number of locational stops, such as four, relatively inexpensive two position pneumatic actuators may be advantageously used.

In FIGS. 4 and 5, two arrangements of four station location operation of the arms are shown somewhat diagrammatically. In FIG. 4, in one position of the second drive pneumatic actuator the longitudinal axis of the second arm 42 is rotated 30° clockwise from the longitudinal axis of the first arm 36. In this position the two arms are shown in solid lines with the work head 52 being located at an assembly location 82 on a movable assembly fixture pallet. When the second pneumatic actuator drive is in its second position, the second arm 42 is rotated clockwise 90° from its initial position and the work head is then at a pickup location indicated by numeral 84. In the illustrated arrangement when the first drive actuator is in its second position, the dashed line position shown, the first arm 36 has been rotated 30° from its initial position. With the second drive actuator in its first position, the work head is at pickup location 86 while if the second drive actuator is in its second position, the work head will be at pickup location 88.

In FIG. 5, an arrangement is illustrated in which the manipulator work head can be positioned in four different locations which are basically in a straight line. This of course is accomplished in part by selecting the proper relative lengths of the two arms 36 and 42. In that connection, it is to be appreciated that the manipulator structure according to the invention is of a character which can be readily scaled up or down.

While the arrangements in FIGS. 4 and 5 show all of the four work stations being within a limited degree of rotation of the two arms, for some applications it may be desirable that each arm have movements of anywhere up to about 360° rotation.

The design is such that it allows a simple interchange of motors for different applications. Thus the manipulator can be changed from the simple four point pick and place operation to a servo-controlled, programmed-path arm by changing the drive motors at the base of the device and by changing the program. Locating all of the powering source means at the base also is advantageous in that the arms themselves are not required to carry additional weight, and as a result numerous advantages such as required force, reduced damping and so on are available.

In tests on a model unit of the invention having a maximum reach of about 30 inches (0.76 m), and carrying a five pound (2.265 Kg) weight at the work head, repetitive overall accuracy from one location to another at an average velocity of 30 inches (0.76 m) per second and a peak velocity of 60 inches (1.52 m) per second, has been found to be about 0.0005 inch (1.27 E-5 m), which is considered to be high precision accuracy and in the order of about 80 times better than many typical industrial requirements. While such a result is attributable to the totality of the model, it is believed that locating the motors so that they are not required to be carried with the arms, and using rotary joints of the kind described, are two of the more important factors.

I claim:
1. A robotic manipulator structure comprising:
   a base supporting first and second independently operable motorized drive means;
   a first generally hollow arm rotatably supported by said base and means for driving said first arm from said first drive means for rotation through one planar space;

a second arm having one end rotatably carried, by the end of said first arm opposite said base, for rotation through another planar space, parallel to and translationally displaced from said first planar space; and means coupled said second drive means to drive said second arm independently of said first arm, said coupling means extending from said base through said first arm to said one end of said second arm;

said driving means for said first arm includes a hollow shaft rotatably supported from said base and fixed at its one end to said first arm and having, at its other end, driven means coupled to said first drive means; and said coupling means for said second arm includes a shaft concentrically and rotatably disposed within said first hollow shaft, said second shaft being hollow and defining an interiorly open space, and having at its one end toothed gearing coupled by toothed linking means through said first arm to drive said second arm, and at the other end of said second shaft driven means coupled to said second drive means.

2. A manipulator structure according to claim 1 wherein:

said first shaft is carried for rotation from said base through angular contact bearings.

3. A manipulator structure according to claims 1 or 2 wherein:

said second shaft is rotatably supported from the interior of said first hollow shaft through angular contact bearings.

4. A manipulator structure according to claim 1 including:

a third hollow shaft disposed at a right angle to said second arm and fixed thereto, said third shaft being rotatably carried by said end of said first arm, said third shaft having toothed driven means thereon adapted to be connected by said toothed linking means to said toothed gearing of said second shaft.

5. A manipulator structure according to claim 1 wherein:

the distal end of said second arm carries a work head;

means for operating said work head including a flexible power conduit extending through said interiorly open space of said second shaft, through most of the length of said first arm and through said third shaft.

6. A robotic manipulator structure comprising:

a base supporting first and second independently operable motorized drive means;

a first, generally-hollow, swinging arm movable through one planar space and carried at its proximate end by a first, right-angle hollow shaft supported by said base for rotation, the end of said shaft opposite said arm including driven means operably connected to said first drive means for rotation thereby;

a second swinging arm movable through another planar space parallel to and translationally displaced from said first planar space and carried at its proximate end by a third right angle hollow shaft supported by the distal end of said first arm for rotation, the end of said third shaft including driven means;

a rotational motion transfer mechanism linking said third shaft driven means for rotation by said second drive means, said mechanism including a second shaft concentric within said first shaft and rotatable relative thereto, means on said second shaft within the hollow portion of said first arm coupling the rotation of said second shaft to the driven means of said third shaft, and means on said second shaft coupling said second shaft for rotation by said second driving means;

both said second and third shafts being hollow and defining interiorly open spaces;

a work head at the distal end of said second arm; and means for operating said work head including a flexible power conduit extending through said interiorly open space of said second shaft, through most of the length of said first arm and through said interiorly open space of said third shaft.

7. A manipulator structure according to claim 6 wherein:

said first shaft is rotatably supported from said base through angular contact bearings; and said second shaft is rotatably supported within said first shaft by angular contact bearings.

* * * * *